(12) United States Patent
Yumoto et al.

(10) Patent No.: US 10,838,343 B2
(45) Date of Patent: Nov. 17, 2020

(54) IMAGE FORMING APPARATUS

(71) Applicant: CANON KABUSHIKI KAISHA, Tokyo (JP)

(72) Inventors: Koji Yumoto, Toride (JP); Satoru Yamamoto, Noda (JP); Toshiyuki Miyake, Nagareyama (JP); Katsuya Nakama, Nagareyama (JP); Riki Fukuhara, Kashiwa (JP); Akihiro Kawakita, Abiko (JP); Yutaka Ando, Toride (JP); Akihiro Arai, Toride (JP); Yuichiro Oda, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 212 days.

(21) Appl. No.: 15/991,999

(22) Filed: May 29, 2018

(65) Prior Publication Data

US 2018/0348688 A1   Dec. 6, 2018

(30) Foreign Application Priority Data

May 31, 2017   (JP) ................................ 2017-108243

(51) Int. Cl.
*G03G 15/00*   (2006.01)
*G03G 15/20*   (2006.01)
*H04N 1/00*    (2006.01)

(52) U.S. Cl.
CPC ....... *G03G 15/607* (2013.01); *G03G 15/2064* (2013.01); *G03G 15/655* (2013.01);
(Continued)

(58) Field of Classification Search
CPC ............ G03G 15/607; G03G 15/2064; G03G 15/6511; G03G 15/655;
(Continued)

(56) References Cited

U.S. PATENT DOCUMENTS

2001/0018626 A1* 8/2001 Moriyama ........... G03G 15/655
                                                  700/223
2003/0063940 A1   4/2003 Furuya
(Continued)

FOREIGN PATENT DOCUMENTS

CN   1584751 A   2/2005
CN   1608857 A   4/2005
(Continued)

*Primary Examiner* — David H Banh
(74) *Attorney, Agent, or Firm* — Canon U.S.A., Inc. I.P. Division

(57) ABSTRACT

An image forming apparatus includes a storage unit to store recording sheets, an image forming unit, an insertion unit, including an interleaving sheet tray on which an interleaving sheet is to be stacked, and to insert the interleaving sheet fed from the interleaving sheet tray between recording sheets conveyed from the image forming unit. The control unit selects between a first mode and a second mode to execute based on a detected remaining amount of recording sheets in the storage unit. The first mode is a mode for feeding the interleaving sheet, which is to be inserted, from the interleaving sheet tray regardless of whether a presence of the recording sheet in the storage unit is detected. The second mode is a mode for feeding the interleaving sheet from the interleaving sheet tray based on that presence of the recording sheet in the storage unit is detected.

8 Claims, 10 Drawing Sheets

(52) U.S. Cl.
CPC ..... *G03G 15/6511* (2013.01); *H04N 1/00167* (2013.01); *G03G 2215/00725* (2013.01); *G03G 2215/00729* (2013.01); *G03G 2215/00869* (2013.01); *G03G 2215/00894* (2013.01)

(58) Field of Classification Search
CPC ... G03G 2215/00725; G03G 2215/729; G03G 2215/00869; G03G 2215/00894; H04N 1/00167
See application file for complete search history.

(56) References Cited

U.S. PATENT DOCUMENTS

| | | | |
|---|---|---|---|
| 2008/0075487 | A1 | 3/2008 | Furushige |
| 2010/0074637 | A1* | 3/2010 | Shiraishi ............... B65H 1/266 399/23 |
| 2012/0070214 | A1* | 3/2012 | Okutsu ............... G03G 15/234 399/388 |
| 2013/0193641 | A1* | 8/2013 | Hasegawa ............. G03G 15/55 271/279 |
| 2013/0286436 | A1* | 10/2013 | Inui ........................ G06K 15/02 358/1.15 |
| 2015/0105231 | A1* | 4/2015 | Ishikawa ............... B65H 31/26 493/320 |
| 2015/0314622 | A1* | 11/2015 | Kimura ................. G06F 3/1219 347/19 |
| 2018/0348687 | A1* | 12/2018 | Arai .................... G03G 15/6508 |
| 2018/0348688 | A1* | 12/2018 | Yumoto ............... G03G 15/655 |
| 2018/0348689 | A1* | 12/2018 | Ando ................... G03G 15/655 |

FOREIGN PATENT DOCUMENTS

| | | |
|---|---|---|
| CN | 1626358 A | 6/2005 |
| CN | 101154065 A | 4/2008 |
| CN | 101470376 A | 7/2009 |
| CN | 103856669 A | 6/2014 |
| EP | 2075634 A1 | 7/2009 |
| JP | 2003221160 A | 8/2003 |

\* cited by examiner

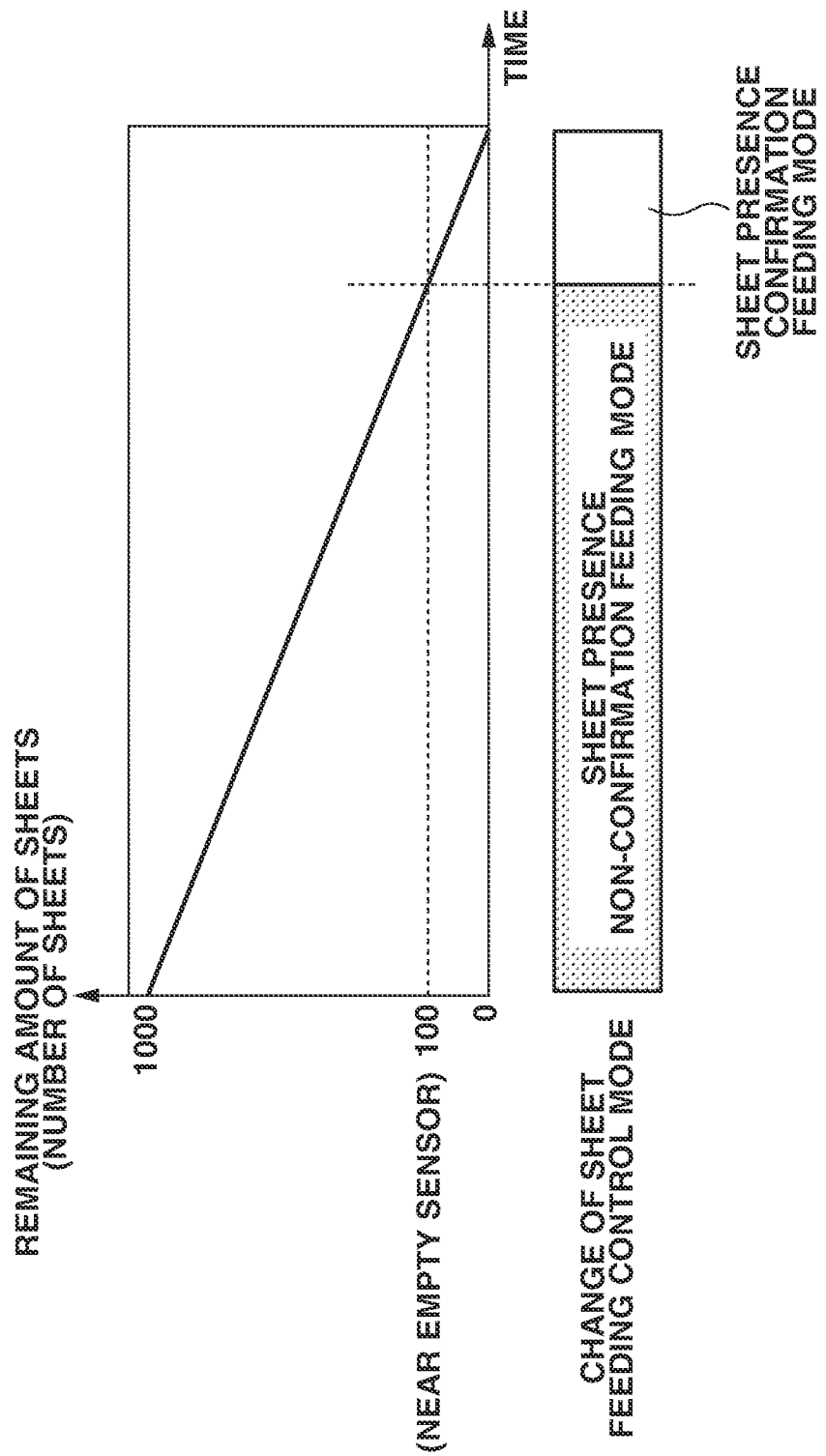

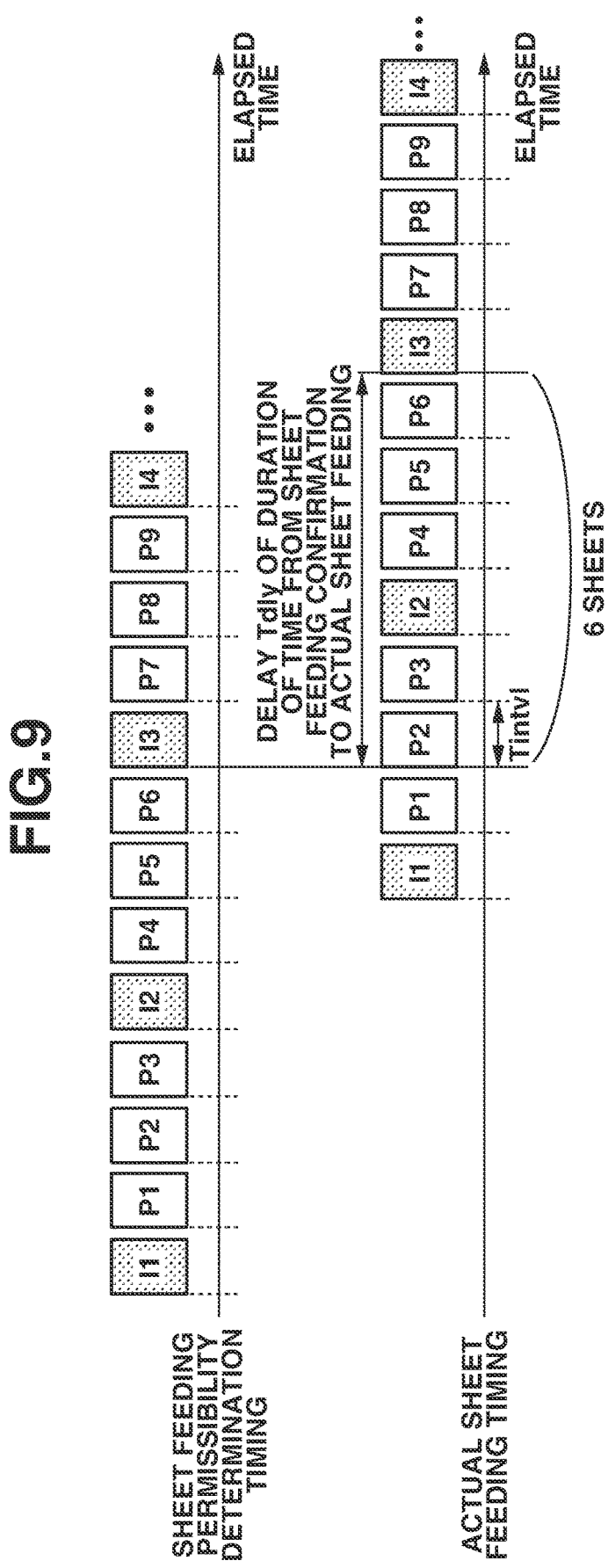

IMAGE FORMING APPARATUS

BACKGROUND OF THE INVENTION

Field of the Invention

The present invention relates to an image forming apparatus having a function of inserting an interleaving sheet.

Description of the Related Art

An image forming apparatus that inserts an interleaving sheet between a plurality of recording sheets on which images are formed to output a booklet including the recording sheets and the interleaving sheet is known. Generally, such an image forming apparatus is connected to an inserter (insertion unit) for interleaving sheet insertion processing, so that an interleaving sheet is inserted between a plurality of recording sheets by the inserter. The inserter includes an interleaving sheet tray on which interleaving sheets are stacked. The inserter supplies an interleaving sheet from the interleaving tray to insert the interleaving sheet between recording sheets conveyed from the image forming apparatus (see Japanese Patent Application Laid-Open No. 2003-221160).

The interleaving sheet and the recording sheet are fed from different sheet feeding sources. In a case where the start timing of interleaving sheet feeding is delayed, a distance between the recording sheet and the interleaving sheet increases. Such an increase in the distance causes a decrease in productivity.

Conventionally, an image forming apparatus has two modes for performing sheet feeding control of an interleaving sheet. One mode is called a "sheet presence confirmation feeding mode". If an interleaving sheet is to be fed from an inserter in the sheet presence confirmation feeding mode, the image forming apparatus needs to confirm that a recording sheet that precedes the interleaving sheet to be inserted is stored in a storage unit of the image forming apparatus. After the confirmation, the image forming apparatus determines that such an interleaving sheet can be fed. Then, the interleaving sheet is fed. However, a sheet feeding preparation time (hereinafter called an "actual sheet feeding delay") is generated. The actual sheet feeding delay is the duration of time from the determination that the interleaving sheet can be feed to the actual interleaving sheet being fed. In the sheet presence confirmation feeding mode, the distance between the immediately preceding recording sheet and the interleaving sheet is increased due to the actual sheet feeding delay. This decreases productivity further.

The other mode is called a "sheet presence non-confirmation feeding mode". If an interleaving sheet is fed from the inserter in the sheet presence non-confirmation feeding mode, the image forming apparatus feeds the interleaving sheet without waiting for confirmation of the presence or absence of a recording sheet that immediately precedes the interleaving sheet that is to be inserted. This enables the recording sheet and the interleaving sheet to be conveyed with a shorter distance therebetween, and thus productivity can be enhanced over that in the sheet presence confirmation feeding mode. Meanwhile, if an interleaving sheet is to be fed from the inserter in the sheet presence non-confirmation feeding mode, the image forming apparatus may determine that an immediately preceding recording sheet to be inserted is not present in the storage unit after the interleaving sheet feeding is started. In such a case, since the feeding of the interleaving sheet has been started, the interleaving sheet is stuck as a "jammed sheet" in the image forming apparatus. If such an interleaving sheet is forcibly discharged, the page order of a product becomes incorrect.

In conventional image forming apparatuses, the sheet presence confirmation feeding mode and the sheet presence non-confirmation feeding mode are set as apparatus fixed modes.

SUMMARY OF THE INVENTION

The present invention is directed to a configuration capable of preventing a jam caused by conveyance of an interleaving sheet and enhancing productivity by controlling interleaving sheet feeding according to an amount of recording sheets stored in a feed unit.

According to an aspect of the present invention, an image forming apparatus includes a storage unit configured to store recording sheets, an image forming unit configured to form an image on a recording sheet fed from the storage unit, an insertion unit, including an interleaving sheet tray on which an interleaving sheet is stacked, configured to insert the interleaving sheet fed from the interleaving sheet tray between recording sheets conveyed from the image forming unit, a first detection unit configured to detect presence or absence of a recording sheet in the storage unit, a second detection unit configured to detect a remaining amount of recording sheets in the storage unit, and a control unit configured to control sheet feeding start timing of the interleaving sheet stacked on the interleaving sheet tray, wherein the control unit starts feeding the interleaving sheet from the interleaving sheet tray regardless of a detection result acquired by the first detection unit before the second detection unit detects that a remaining amount of recording sheets in the storage unit is small, and wherein the control unit starts feeding the interleaving sheet from the interleaving sheet tray based on a detection result acquired by the first detection unit after the second detection unit detects that a remaining amount of recording sheets in the storage unit is small.

Further features of the present invention will become apparent from the following description of exemplary embodiments with reference to the attached drawings. Each of the embodiments of the present invention described below can be implemented solely or as a combination of a plurality of the embodiments. Also, features from different embodiments can be combined where necessary or where the combination of elements or features from individual embodiments in a single embodiment is beneficial.

BRIEF DESCRIPTION OF THE DRAWINGS

FIG. 6 is a diagram illustrating switching of an interleaving sheet feeding mode.

FIG. 9 is a schematic diagram illustrating calculation of a remaining amount threshold if sheet feeding control is switched.

DESCRIPTION OF THE EMBODIMENTS

Exemplary embodiments will be described with reference to the drawings. Note that components described in each of the exemplary embodiments are just examples, and the present disclosure is not limited to the following exemplary embodiments.

<Overall Configuration>

Figure 1:
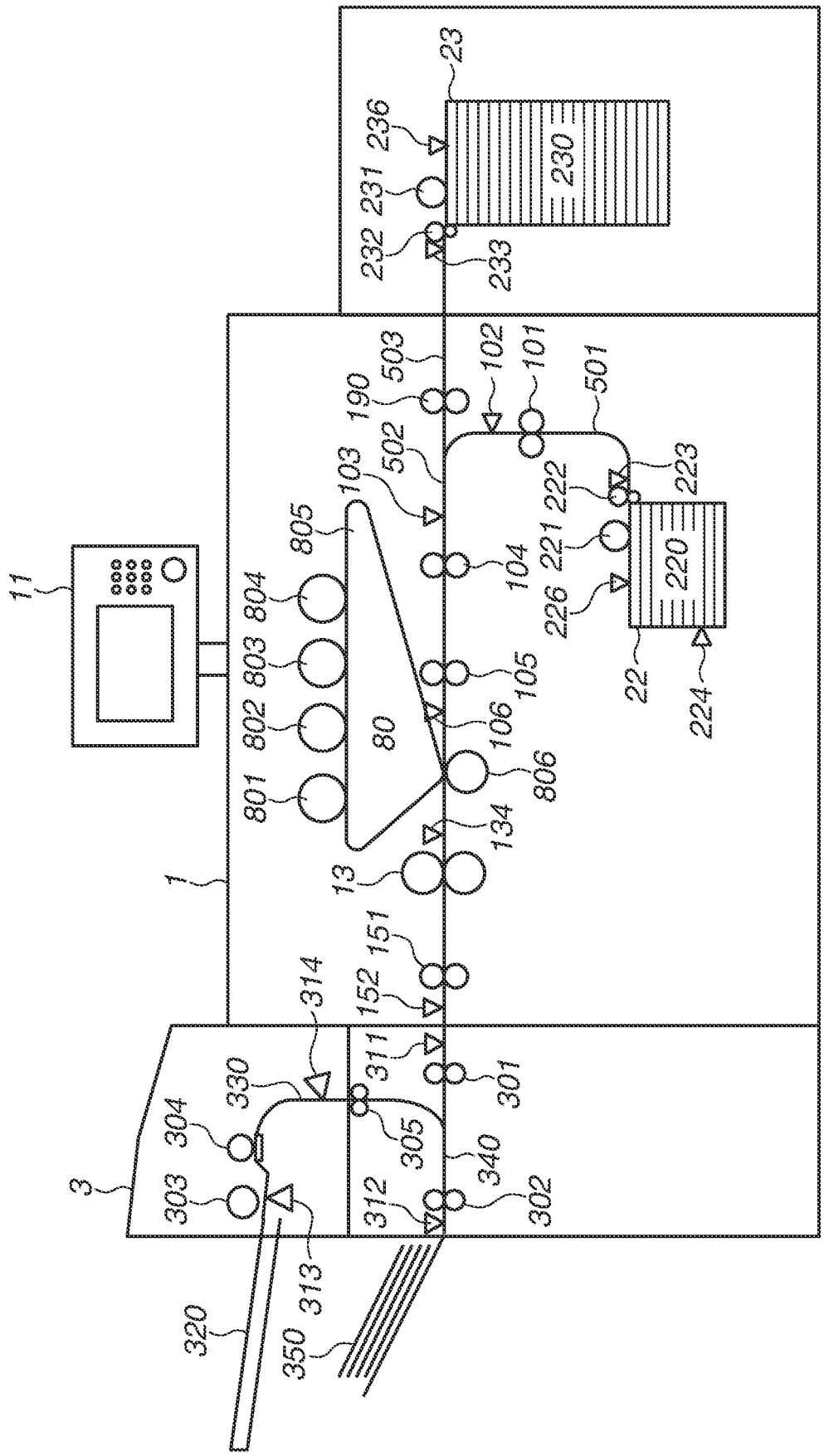
FIG. 1 is a sectional view of an image forming apparatus.

FIG. 1 illustrates an image forming apparatus 1 according to a first exemplary embodiment. In the present exemplary embodiment, an inserter 3 is connected to the image forming apparatus 1, and an interleaving sheet can be inserted between recording sheets.

The image forming apparatus 1 is an electrophotographic image forming apparatus. The image forming apparatus 1 includes an image forming unit 80 that forms an image on a recording sheet fed from a feed unit 22 or a feed unit 23. Further, the image forming apparatus 1 includes a user interface 11. The image forming apparatus 1 executes a job such as a copy job and a print job according to a user instruction from the user interface 11. If a user issues an instruction for executing a job, recording sheets are fed one by one from the feed unit 22, and the image forming unit 80 forms an image on the recording sheet.

The feed unit 22 includes a sheet storage 220 as an example of a storage unit in which recording sheets are stored. The sheet storage 220 is controlled by a lifter motor 202 and a sheet surface sensor 226 so that the top sheet contacts a pickup roller 221. The sheet surface sensor 226 is a sheet presence/absence detection unit (first detection unit) for detecting the presence or absence of a recording sheet. The sheet surface sensor 226 detects the presence or absence of a next recording sheet when a recording sheet has been actually fed and the trailing end thereof has passed a sheet feeding sensor 223.

A near empty sensor 224 is a remaining amount detection unit (a second detection unit) for detecting a remaining amount of the recording sheets stored in the sheet storage 220. The near empty sensor 224 is an optical sensor. The near empty sensor 224 determines that a remaining amount of the recording sheets is large if a sensor light receiving portion is shielded from light by the recording sheets. The near empty sensor 224 determines that a remaining amount of the recording sheets is small if light is transmitted through the sensor light receiving portion.

The pickup roller 221 feeds the top sheet out of the recording sheets stored in the feed unit 22 to feed rollers 222. The feed rollers 222 include an upper roller that rotates in a feed direction and a lower roller that rotates in a return direction. The feed rollers 222 separate the recording sheets one by one to feed the separated recording sheet.

The image forming apparatus 1 uses the sheet feeding sensor 223 to check whether the top sheet has been picked up at a predetermined timing. If the sheet feeding sensor 223 is not turned on even if a predetermined time or more has elapsed since the start of the pickup operation, the image forming apparatus 1 stops conveyance of the recording sheet due to a jam (hereinafter referred to as "paper jamming"). Further, if the sheet feeding sensor 223 is not turned off even if a predetermined time or more has elapsed since a trailing end of the recording sheet has passed, the image forming apparatus 1 stops conveyance of the recording sheet due to a paper jamming.

After passing through the feed rollers 222, the recording sheet is conveyed to a vertical path 501. Then, the recording sheet passes a vertical path sensor 102 by a vertical path roller 101, and is guided to a conveyance path 502, so that an image is transferred to the recording sheet in the image forming unit 80 including drums 801 through 804, an intermediate transfer member 805, and a secondary transfer unit 806.

In addition to the feed unit 22, the image forming apparatus 1 includes the feed unit 23. When an instruction for executing a job including designation of the feed unit 23 is issued from the user interface 11, recording sheets stored in the feed unit 23 are fed one by one toward the image forming unit 80. The feed unit 23 includes a sheet storage 230 that stores the recording sheets. A position of the top surface of the recording sheet in the sheet storage 230 is controlled by a lifter motor 204 and a sheet sensor 236 so that the top sheet contacts a pickup roller 231. Unlike the feed unit 22, the feed unit 23 does not include a near empty sensor (remaining amount detection unit) for detecting a remaining amount of recording sheets although the feed unit 23 includes a sensor (third detection unit) for detecting the presence or absence of a recording sheet.

The pickup roller 231 feeds the top sheet in the sheet storage 230 to feed rollers 232. The feed rollers 232 include an upper roller that rotates in a feed direction and a lower roller that rotates in a return direction. The feed rollers 232 separate recording sheets one by one to feed the separated recording sheet. The recording sheet passing through the feed rollers 232 is conveyed to a horizontal path 503.

The image forming apparatus 1 aligns an image in the image forming unit 80 and a leading end of the recording sheet in the conveyance path 502 based on detection signals of a pre-registration sensor 103, a pre-registration roller 104, a registration roller 105, and a registration sensor 106. The alignment of the image and the leading end of the recording sheet is performed by driving the registration roller 105 based on a signal synchronized with the image formation.

A fixing unit 13 causes the recording sheet with a transferred image thereon to pass therethrough, thereby fixing the image on the recording sheet. The recording sheet with the fixed image thereon is conveyed toward the inserter 3 by a discharge roller 151. The image forming apparatus 1 uses a discharge sensor 152 to check whether delivery of the recording sheet to the inserter 3 is completed at a predetermined timing. In a case where recording sheet remains even if the predetermined timing has elapsed, the image forming apparatus 1 determines that a paper jamming has occurred, and stops the conveyance of the recording sheet.

<Configuration of Inserter 3>

Next, a configuration of the inserter 3 is described. A recording sheet with an image formed thereon by the image forming apparatus 1 is delivered to the inserter 3 via the discharge roller 151. When the recording sheet is detected by an inserter inlet sensor 311 of the inserter 3, then the recording sheet is conveyed toward a conveyance path 340 by driving an inlet roller 301. After passing through a discharge roller 302, the recording sheet is simply discharged toward a discharge tray 350 of the inserter 3. An inserter discharge sensor 312 detects whether the recording sheet is normally discharged to the discharge tray 350.

The description has been given of the drive system by which the recording sheet with the image formed thereon by the image forming apparatus 1 is discharged to the discharge tray 350. Hereinafter, a drive system that conveys an interleaving sheet fed from an interleaving sheet tray 320 of the inserter 3 is described.

The inserter 3 includes the interleaving sheet tray 320 on which interleaving sheets are stacked. The top sheet out of the interleaving sheets stacked on the interleaving sheet tray 320 is conveyed downstream by a feed roller 303, and only the one top sheet is reliably conveyed to a conveyance path 330 by a separation roller 304. The interleaving sheet guided to the conveyance path 330 is conveyed for a predetermined distance from an inserter registration sensor 314, and a leading end of the interleaving sheet in a conveyance direction contacts a stopped registration roller 305. Thus, the conveyance of the interleaving sheet temporarily stops with the interleaving sheet formed in loop. Accordingly, a skew of the interleaving sheet is corrected. The skew is generated in the sheet conveyance operation.

After the conveyance of the interleaving sheet stops for a predetermined time by contacting the leading end of the interleaving sheet with the registration roller 305, the separation roller 304, the registration roller 305, and the discharge rollers 302 are driven to discharge the interleaving sheet to the discharge tray 350 via a merging point between the conveyance path 330 and the conveyance path 340.

Figure 2:
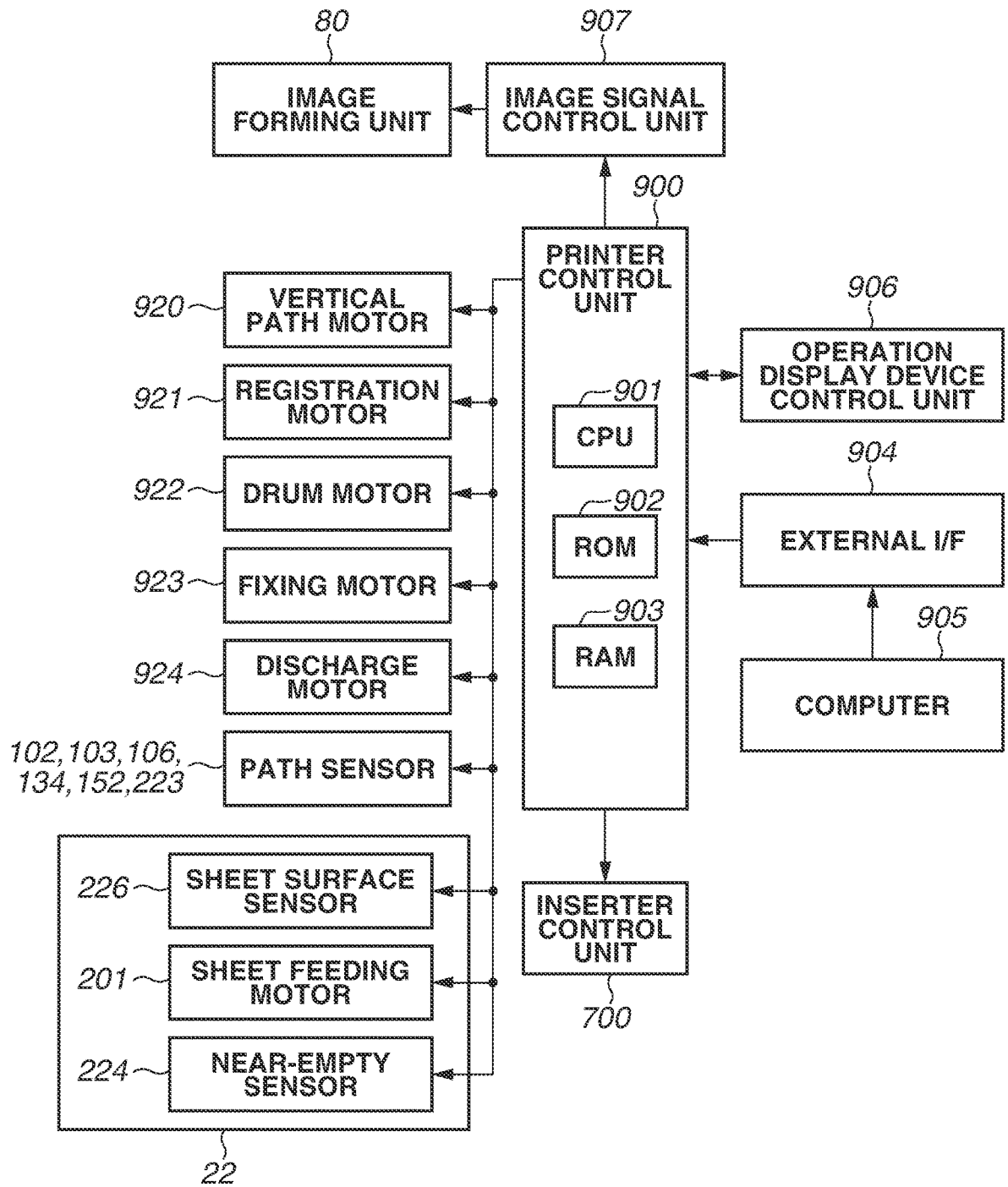
FIG. 2 is a block diagram of the image forming apparatus.

FIG. 2 illustrates a configuration of a controller (control unit) for controlling the image forming apparatus 1. The controller includes a printer control unit 900, and the printer control unit 900 includes a central processing unit (CPU) 901, a read only memory (ROM) 902, and a random access memory (RAM) 903. The CPU 901 executes a program stored in the ROM 902 to control an image signal control unit 907, an operation display device control unit 906, and the image forming apparatus 1.

The RAM 903 is a volatile memory. The RAM 903 temporarily stores data or is used as a work area of the CPU 901. The image signal control unit 907 performs various kinds of processing on a digital image signal that is input from a computer 905 via an external interface (I/F) 904. The image signal control unit 907 converts such a digital image signal into a video signal to output the video signal to the image forming unit 80. The operation display device control unit 906 controls the user interface 11 to exchange information with the printer control unit 900.

The user interface 11 includes a plurality of keys for setting various functions relating to image formation, and a display unit for displaying information indicating a setting state. Further, the user interface 11 outputs a key signal corresponding to the operation of each key to the printer control unit 900, and displays corresponding information on the display unit based on a signal from the printer control unit 900.

Next, a main sheet-conveyance drive system of the image forming apparatus 1 is described with reference to FIGS. 1 and 2. The image forming apparatus 1 includes a sheet feeding motor 201 and a vertical path motor 920 as drive sources for sheet conveyance from the feed unit 22 to the vertical path 501. The sheet feeding motor 201 drives the pickup roller 221, whereas the vertical path motor 920 drives the feed rollers 222 and the vertical path roller 101.

The feed unit 22 includes the near empty sensor 224 (second detection unit) for detecting that a remaining amount of the recording sheets stored in the sheet storage 220 becomes less than a reference amount.

The image forming apparatus 1 includes a sheet feeding motor 203 and the vertical path motor 920 as drive sources for sheet conveyance from the feed unit 23 to the horizontal path 503. The sheet feeding motor 203 drives the pickup roller 231, whereas the vertical path motor 920 drives the feed rollers 232 and a conveyance roller 190.

The image forming apparatus 1 includes a registration motor 921 as a drive source for sheet conveyance from the conveyance path 502 to a transfer unit. The registration motor 921 drives the pre-registration roller 104 and the registration roller 105.

The image forming apparatus 1 includes a drum motor 922, a fixing motor 923, and a discharge motor 924 as drive sources for conveying sheet from the transfer unit to a discharge unit. The drum motor 922 drives the drums 801 through 804, the intermediate transfer member 805, and the secondary transfer unit 806 in the image forming unit 80. The fixing motor 923 drives the fixing unit 13. The discharge motor 924 drives the discharge roller 151. In addition, signal output sensors (path sensors) such as the vertical path sensor 102, the pre-registration sensor 103, the registration sensor 106, a path sensor 134, the discharge sensor 152, and the sheet feeding sensor 223 are arranged so that passage of a sheet is detected.

After passing through the discharge roller 151, the recording sheet is delivered to the inserter 3 and then controlled by an inserter control unit 700.

Figure 3:
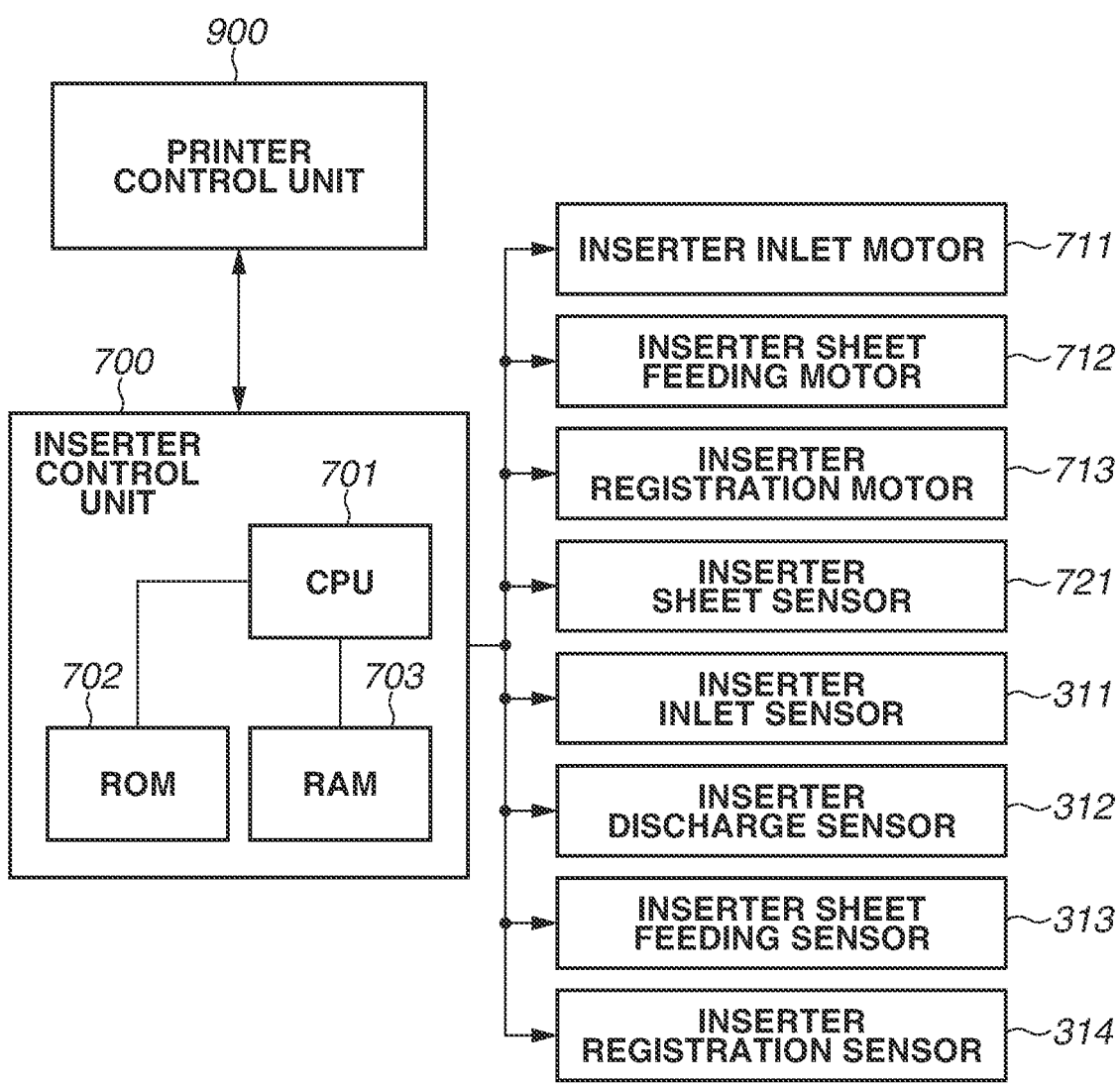
FIG. 3 is a block diagram of an inserter control unit.

FIG. 3 is a block diagram illustrating a configuration of the inserter control unit 700 illustrated in FIG. 2. The inserter control unit 700 includes a CPU 701, a ROM 702, and a RAM 703. The inserter control unit 700 controls the inserter 3 according to a control program stored in the ROM 702. The RAM 703 temporality stores data. Further, the RAM 703 is used as a work area for arithmetic processing necessary for the control operation.

Next, a sheet conveyance drive system of the inserter 3 is described with reference to FIGS. 1 and 3. The inserter 3 includes an inserter inlet motor 711 as a drive source for conveying the recording sheet received from the image forming apparatus 1 to the discharge tray 350. The inserter inlet motor 711 drives an inlet roller 301 and the discharge rollers 302.

Further, the inserter 3 includes an inserter sheet feeding motor 712 as a drive source for pulling in an interleaving sheet from the interleaving sheet tray 320 and correcting a skew of the interleaving sheet on the conveyance path 330. The inserter sheet feeding motor 712 drives the feed roller 303 and the separation roller 304.

The inserter 3 includes an inserter registration motor 713 as a drive source for conveying the skew corrected interleaving sheet to a merging point from the image forming apparatus 1 after the skew of the interleaving sheet fed from the interleaving sheet tray 320 is corrected. The inserter registration motor 713 drives the registration roller 305.

The interleaving sheet tray 320 includes an inserter sheet sensor 721. The inserter sheet sensor 721 detects presence or absence of an interleaving sheet on the interleaving sheet tray 320. If a plurality of interleaving sheets is stacked on the interleaving sheet tray 320, the inserter sheet sensor 721 can detect the presence or absence of a next interleaving sheet only when an immediately preceding interleaving sheet passes the inserter sheet sensor 721.

In addition, detection signal output sensors (path sensors) such as the inserter inlet sensor 311, the inserter discharge sensor 312, an inserter sheet feeding sensor 313, and the inserter registration sensor 314 are arranged so that passage of a sheet is detected.

The configurations of the image forming apparatus 1 and the inserter 3 according to the present exemplary embodiment have been described. Next, sheet feeding control of interleaving sheet is described.

In the present exemplary embodiment, two modes as modes in which feeding of an interleaving sheet from the inserter 3 is controlled are described. One mode is called "a sheet presence confirmation feeding mode". If an interleaving sheet is fed from the inserter 3 in the sheet presence confirmation feeding mode, the image forming apparatus 1 needs to confirm that a recording sheet that immediately precedes the interleaving sheet that is to be inserted is stored in the feed unit 22 thereof. After the confirmation, the image forming apparatus determines that such an interleaving sheet can be fed. Then, the interleaving sheet is fed. In the sheet presence confirmation feeding mode, a sheet feeding preparation time (hereinafter called an "actual sheet feeding delay") is generated. The actual sheet feeding delay is a duration of time from the determination that the interleaving sheet can be fed to the actual interleaving sheet feeing. A distance between an immediately preceding recording sheet and the interleaving sheet is increased due to the actual sheet feeding delay. This degrades productivity.

The other mode is called a "sheet presence non-confirmation feeding mode". If an interleaving sheet is to be fed from the inserter 3 in the sheet presence non-confirmation feeding mode, the image forming apparatus starts feeding of an interleaving sheet without waiting for confirmation on the presence or absence of a recording sheet that precedes the interleaving sheet that is to be inserted. This prevents the aforementioned actual sheet feeding delay, and thus productivity in the sheet presence non-confirmation feeding mode can be more enhanced than that in the sheet presence confirmation feeding mode. Meanwhile, in a case where an interleaving sheet is fed from the inserter in the sheet presence non-confirmation feeding mode, the image forming apparatus may determine that an immediately preceding recording sheet to be inserted is not present in the feed unit 22 after the interleaving sheet feeding is started. In such a case, since the feeding of the interleaving sheet is once started, the interleaving sheet is stuck as a jammed sheet inside the image forming apparatus. If such an interleaving sheet is forcibly discharged, page order of a product becomes incorrect.

Hereinafter, each of the sheet presence confirmation feeding mode and the sheet presence non-confirmation feeding mode is described in detail.

<Sheet Feeding Control of Interleaving Sheet in Sheet Presence Confirmation Feeding Mode>

Figure 4:
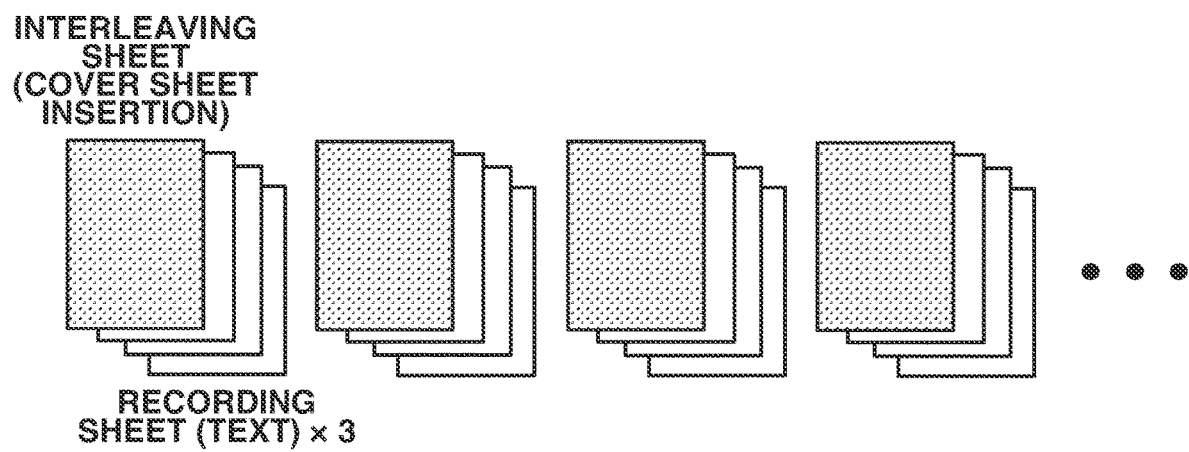
FIG. 4 is a diagram illustrating an example of an image forming job in which an interleaving sheet is inserted with respect to recording sheets.
Figure 5A:
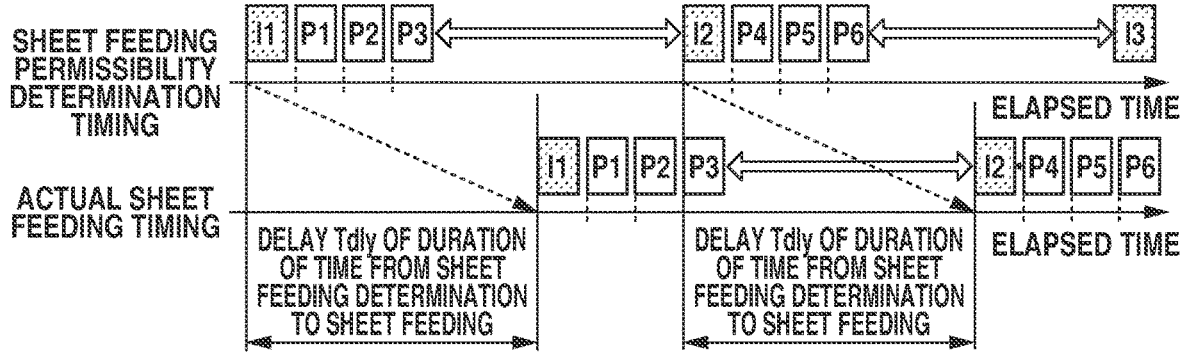
FIGS. 5A, 5B, 5C, and 5D are diagrams illustrating a relationship between sheet feeding permissibility determination timing of an interleaving sheet and actual sheet feeding timing.

FIG. 4 is a diagram illustrating a job in which a plurality of bundles is output. Each bundle includes three sheets each with text on one side, and an interleaving sheet (cover sheet) in the front of the three sheets. FIG. 5A 5A is a diagram illustrating a relationship between a sheet feeding permissibility determination timing of each page of the job illustrated in FIG. 4 and an actual sheet feeding timing. Herein, a description is given using an example in which a sheet is fed from the feed unit 22.

First, sheet feeding permissibility determination of an interleaving sheet I1 that is to be inserted in the front of a first bundle is performed. Since the interleaving sheet I1 is the front sheet and there is no immediately preceding sheet, the interleaving sheet I1 can be unconditionally fed.

The interleaving sheet I1 is fed from the inserter 3, and an image is not formed on the interleaving sheet I1 by the image forming apparatus 1 in practice. However, in the present exemplary embodiment, a blank image is formed in a pseudo manner, and interleaving sheet dummy conveyance is performed inside the apparatus to synchronize with the blank image.

In the present exemplary embodiment, a duration of time from the beginning of image formation on the drum 801 to the arrival of the image in the secondary transfer unit 806 via the intermediate transfer member 805 is longer than a duration of time from the beginning of sheet feeding from the feed unit 22 to the arrival of the sheet in the secondary transfer unit 806. Accordingly, even if image formation is started immediately after the sheet feeding permissibility determination, sheet feeding cannot be performed unless the image reaches a certain position (POS1 illustrated in FIG. 5C). Accordingly, the actual sheet feed timing is a Tdly time behind a time at which it is determined that sheet feeding can be performed. The Tdly time is a sheet feeding preparation time, and is called an "actual sheet feeding delay". In the present exemplary embodiment, the actual sheet feeding delay Tdly is approximately 5 seconds.

Sheet the feeding permissibility determination of a recording sheet P1 subsequent to the interleaving sheet I1 is performed when the presence of the interleaving sheet I1 is confirmed. Herein, since the presence of the interleaving sheet in the interleaving sheet tray 320 has been confirmed, it is determined that the recording sheet P1 can also be fed.

Recording sheets P2 and P3 are fed from the same sheet feeding cassette as the recording sheet P1. Thus, even if an unexpected absence of sheet occurs, a remaining sheet is not generated or order of products is not switched. Therefore, it is determined that the recording sheets P2 and P3 can be fed.

Next, the sheet feeding permissibility determination of an interleaving sheet I2 that is to be inserted in the front of a second bundle is described. The interleaving sheet I2 is to be fed from a sheet feeding source different from the sheet feeding source from which the recording sheet P3 of an immediately preceding sheet has been fed. Thus, it is determined that the interleaving sheet I2 can be fed only if the presence of the recording sheet P3 is determined. The presence or absence of the recording sheet P3 is detected after the immediately preceding recording sheet P2 is actually fed and a trailing end of the recording sheet P2 passes the sheet feeding sensor 223.

Accordingly, the sheet feeding permissibility determination of an interleaving sheet that is to be inserted in the front of each of second or subsequent bundles is delayed until the presence or absence of a preceding recording sheet is detected. Consequently, actual feeding of interleaving sheet is delayed by an amount of time of a delay in the sheet feeding permissibility determination, and a distance between the recording sheet P3 and the interleaving sheet I2 increases. This degrades productivity.

Figure 5B:
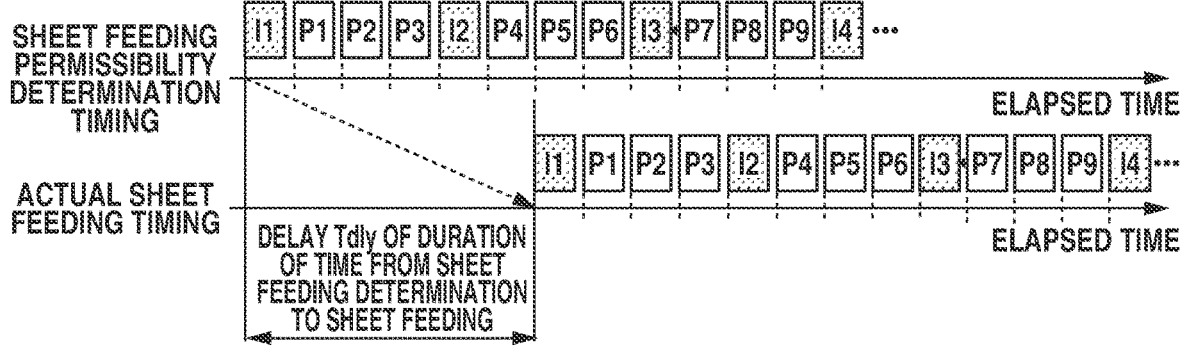
Figure 5C:
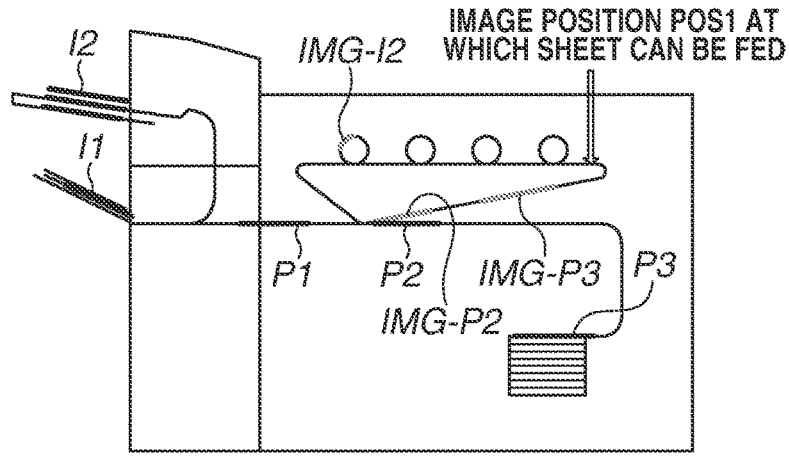

FIG. 5C illustrates a positional relationship between a sheet and an image in the sheet presence confirmation feeding mode. In FIG. 5C, the interleaving sheets I1 and I2, the recording sheets P1, P2, and P3, and images IMG-P2, IMG-P3, and IMG-I2 are illustrated. The images IMG-P2, IMG-P3, and IMG-I2 are images to be respectively transferred to the recording sheets P2, P3, and the interleaving sheet I2. Since the image IMG-I2 is for the interleaving sheet I2, the image IMG-I2 is a blank image. After the presence of the recording sheet P3 is confirmed and it is determined that the interleaving sheet I2 can be fed, image formation of the image IMG-I2 begins. Thus, a distance between the image IMG-I2 and the image IMG-P3 increases. The interleaving sheet I2 is fed to synchronize with the arrival of the image IMG-I2 in the inserter 3 after the image IMG-I2 passes the secondary transfer unit 806. Accordingly, a distance between the recording sheet P3 and the interleaving sheet I2 is increased by an extra amount of distance corresponding to a time difference between the image formation for the recording sheet P3 and the image formation for the interleaving sheet I2.

<Sheet Feeding Control of Interleaving Sheet in Sheet Presence Non-Confirmation Feeding Mode>

FIG. 5B illustrates a relationship between the sheet feeding permissibility determination timing and the sheet feeding timing in the sheet presence non-confirmation feeding mode with respect to the job illustrated in FIG. 4.

As for a first bundle, the sheet feeding permissibility determination of an interleaving sheet in the sheet presence non-confirmation feeding mode is similar to that in the sheet presence confirmation feeding mode. However, as for the sheet feeding permissibility determination of an interleaving sheet I2 to be inserted in the front of a second bundle, it is determined that the interleaving sheet I2 can be fed even if the presence of a immediately preceding recording sheet P3 has not been confirmed, and an operation for pulling in the interleaving sheet I2 is started. In such a case, since feeding of the interleaving sheet I2 is performed without waiting for confirmation of the presence of the recording sheet P3, an actual sheet feeding delay Tdly does not occur, and productivity is not degraded. However, in a case where the absence of the recording sheet P3 in the feed unit 22 is found after the recording sheet P2 is fed, the interleaving sheet I2 is stuck inside the apparatus as a jammed sheet. In such a case, if the interleaving sheet I2 is forcibly discharged, page order of a product becomes incorrect.

Figure 5D:
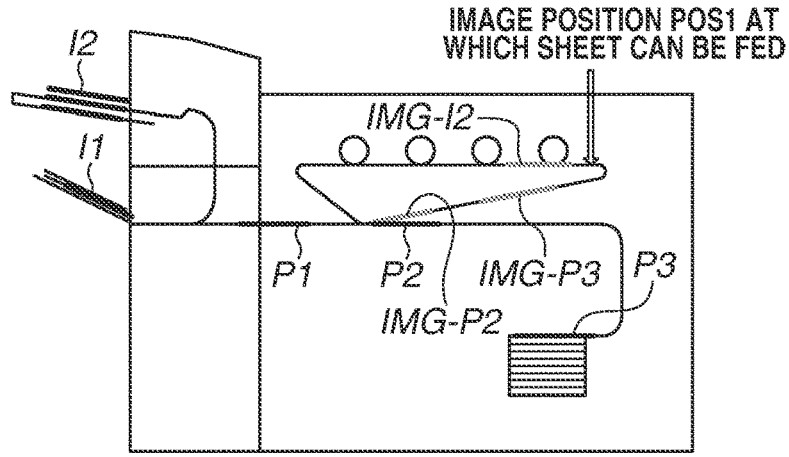

FIG. 5D is a diagram illustrating a positional relationship between a sheet and an image in the sheet presence non-confirmation feeding mode. In the sheet presence non-confirmation feeding mode, since feeding of the interleaving sheet I2 is confirmed without waiting for confirmation of the presence of the recording sheet P3, an extra distance between an image IMG-P3 and an image IMG-I2 is not generated. Therefore, since the interleaving sheet is fed to synchronize with arrival of the image IMG-I2 in the inserter 3, a distance between the immediately preceding recording sheet P3 and the interleaving sheet I2 is not increased, and thus productivity is not degraded.

<Switching Between Sheet Presence Confirmation Feeding Mode and Sheet Presence Non-Confirmation Feeding Mode>

Next, switching between the sheet presence confirmation feeding mode and the sheet presence non-confirmation feeding mode is described.

As described above, if feeding of an interleaving sheet is controlled in the sheet presence non-confirmation feeding mode, the sheet feeding feasibility determination of the interleaving sheets I2 and I3 of the respective second and third bundles is performed without waiting for confirmation of the presence or absence of the respective immediately preceding recording sheets P3 and P6. Accordingly, there is a possibility that the absence of an immediately preceding recording sheet may be detected after an interleaving sheet is fed. However, if a remaining amount of recording sheets in a feed unit in which a recording sheet that immediately precedes an interleaving sheet that is to be inserted is stored is found in advance, the absence of a sheet can be predicted in advance. More specifically, a sheet feeding mode is switched from the sheet presence non-confirmation feeding mode to the sheet presence confirmation feeding mode based on a detection indicating that a remaining amount of the recording sheets is small. Such switching can prevent discharge of an incorrect product due to unexpected absence of a recording sheet while limiting degradation in productivity as much as possible.

Hereinafter, a method for determining sheet feeding timing of an interleaving sheet according to a remaining amount of recording sheets is described.

FIG. 6 is a schematic diagram illustrating switching of the interleaving sheet feeding control mode. Assuming that 1000 recording sheets are placed in the sheet storage 220 of the feed unit 22. When the job illustrated in FIG. 4 is executed, three recording sheets per bundle are fed from the feed unit 22. In a state in which there are 1000 recording sheets remaining in the feed unit 22, the absence of sheets does not occur. Thus, when a job is started, sheet feeding control is performed in the sheet presence non-confirmation feeding mode. A remaining amount of the recording sheets is decreased from the initial amount of 1000 sheets. If the job continues for a while, the near empty sensor 224 detects that the remaining amount of recording sheets stored in the feed unit 22 becomes 100 sheets or less. After the near empty sensor 224 detects that the remaining amount of recording sheets is 100 sheets or less, the sheet feeding control mode is switched from the sheet presence non-confirmation feeding mode to the sheet presence confirmation feeding mode to prevent paper jamming of the interleaving sheet due to the absence of a recording sheet. This can enhance productivity while preventing paper jamming of an interleaving sheet at the time of the absence of a recording sheet.

<Flowchart Illustrating Sheet Feeding Control of Interleaving Sheet>

Figure 7A:
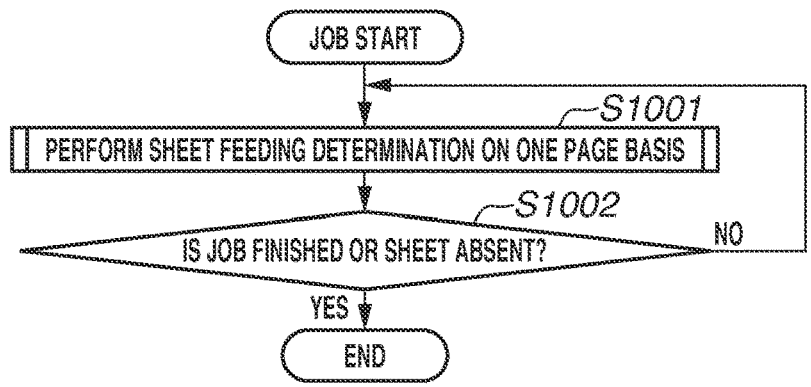
FIGS. 7A and 7B are flowcharts illustrating sheet feeding control according to an exemplary embodiment.
Figure 7B:
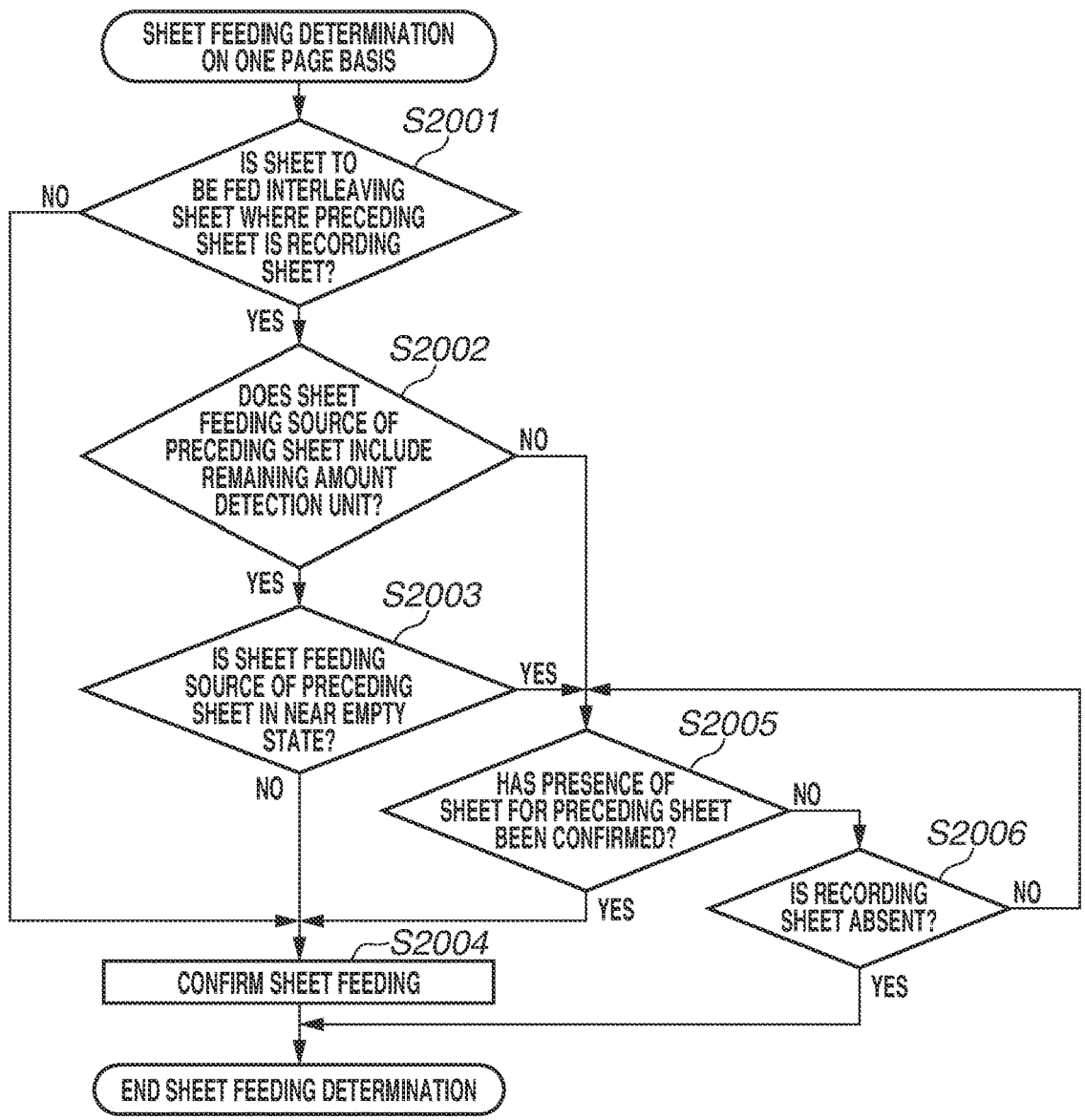

FIGS. 7A and 7B illustrate switching of a sheet feeding control mode according to a remaining amount of recording sheets. When a job beings, the processing in step S1001 of the flowchart illustrated in FIG. 7A is performed. In step S1001, the CPU 901 performs sheet feeding determination on one page basis. This determination is performed based on information of each page of the image forming job queued in the RAM 903. The information of each page queued in the RAM 903 includes feed unit information indicating which feed unit is to feed a sheet for the corresponding page. The sheet feeding determination in step S1001 is described in detail below with reference to FIG. 7B. After the processing in step S1001 is performed, the processing proceeds to step S1002. In step S1002, the CPU 901 determines whether sheet feeding permissibility determination has been performed on all pages of the image forming job with respect to the page information queued in the RAM 903. If a sheet to be further fed is absent based on a result of the determination (YES in step S1002), the processing flow illustrated in FIG. 7A ends. Further, if the CPU 901 determines that a recording sheet to precede an interleaving sheet is absent in the feed unit 22 as a result of the processing in step S1001 (YES in step S1002), the processing flow illustrated in FIG. 7A ends, and the CPU 901 displays a message indicating that a recording sheet has become absent on the user interface 11.

If a recording sheet is not absent, and page information of a sheet to be fed next is still being queued in the RAM 903 (NO in step S1002), the processing returns to step S1001. In step S1001, the sheet feeding determination is performed again on one page basis.

Next, the processing in step S1001 illustrated in FIG. 7A is described in detail with reference to FIG. 7B. In step S2001, the CPU 901 reads out information of a sheet to be fed from now from the RAM 903 to identify which feed unit feeds an interleaving sheet based on the information of such a sheet. If the identified feed unit is the interleaving sheet tray 320 of the inserter 3, and a feed unit of an immediately preceding sheet is the feed unit 22 (YES in step S2001), the processing proceeds to step S2002. If the sheet to be fed is a sheet other than the interleaving sheet, or the immediately preceding sheet is not a recording sheet (NO in step S2001), the processing proceeds to step S2004. In step S2004, the CPU 901 confirms sheet feeding.

Next, in step S2002, the CPU 901 determines whether the feed unit which has fed the immediately preceding sheet includes a remaining amount detection unit. If the CPU 901 identifies that the sheet feeding source of the sheet, which has preceded the interleaving sheet, is the feed unit 22 including the near empty sensor 224, the CPU 901 determines that the feeding unit includes the remaining amount detection unit (YES in step S2002) and the processing proceeds to step S2003.

The present exemplary embodiment is described using an example in which the CPU 901 identifies whether a feed unit includes a near empty sensor. However, the CPU 901 may make such determination based on information acquired from a configuration information table that is stored in the ROM 902 and that indicates whether each sheet feeding cassette includes a remaining amount detection unit.

Further, there may be a feed unit that does not have a signal line for notifying the printer control unit 900 of a remaining amount detection result via a communication I/F, although the feed unit includes a remaining amount detection unit. In such a case, the CPU 901 may determine that such a feed unit does not include a remaining amount detection unit.

In step S2003, the CPU 901 determines whether a remaining amount of recording sheets in the sheet feeding source of the immediately preceding sheet is greater than a threshold to be detected by the near empty sensor 224. If the CPU 901 determines that a remaining amount of recording sheets in the sheet feeding source of the immediately preceding sheet is not yet in a near empty state (NO in step S2003), the processing proceeds to step S2004. In step S2004, the CPU 901 confirms sheet feeding. If the CPU 901 determines that a remaining amount of recording sheets in the sheet feeding source of the immediately preceding sheet is a near empty state (YES in step S2003), the processing proceeds to step S2005.

If the CPU 901 identifies that the sheet feeding source of the sheet which immediately precedes the interleaving sheet is the feed unit 23 having no near empty sensor, the CPU 901 determines that the sheet feeding source does not include a remaining amount detection unit (NO in step S2002), and the processing proceeds to step S2005.

In step S2005, the CPU 901 determines whether the presence of a sheet for the immediately preceding sheet has been confirmed by using the sheet feeding sensor 223. If the CPU 901 determines that the presence of a sheet for the immediately preceding sheet is confirmed (YES in step S2005), an interleaving sheet can be fed without a problem. Thus, the processing proceeds to step S2004. In step S2004, the CPU 901 confirms the sheet feeding. If the CPU 901 determines that the presence of the sheet for the immediately preceding sheet has not yet been confirmed (NO in step S2005), the processing proceeds to step S2006. In step S2006, the CPU 901 determines whether the recording sheet is absent. If the CPU 901 determines that the recording sheet is absent (YES in step S2006), the CPU 901 determines that the sheet cannot be fed, and the processing flow illustrated in FIG. 7B ends.

If the CPU 901 determines that the recoding sheet is not absent (NO in step S2006), the processing returns to step S2005, so that the CPU 901 repeats the processing until the presence of the sheet for the immediately preceding sheet is confirmed, or the recording sheet becomes absent.

If the CPU 901 confirms the sheet feeding in step S2004 or determines that the recording sheet becomes absent (YES in step S2006), the sheet feeding determination ends, and the processing flow illustrated in FIG. 7B ends.

As described above, according to the present exemplary embodiment, an interleaving sheet feeding control mode is switched from the sheet presence non-confirmation feeding mode to the sheet presence confirmation feeding mode according to a remaining amount of recording sheets stored in a feed unit. This can enhance productivity while preventing paper jamming of an interleaving sheet at the time of the absence of recording sheet.

In the present exemplary embodiment, a near empty sensor is used as one example of a remaining sheet detection unit of a feed unit. However, other units can be used. For example, a remaining amount can be detected by detecting a lifter height or detecting a weight of recording sheets on a tray.

The first exemplary embodiment has been described using a method for switching a sheet feeding control mode based on a detection result that is acquired by the near empty sensor 224 and indicates that a remaining amount of recording sheets is small. However, the sheet feeding control mode may remain in the sheet presence non-confirmation feeding mode for a while depending on a remaining amount detected by the near empty sensor 224, instead of switching to the sheet presence confirmation feeding mode immediately after detecting a small remaining amount. This can further enhance productivity.

Accordingly, in a second exemplary embodiment, a description is given of a method for continuing the sheet presence non-confirmation feeding mode until the certain number of sheets is fed after the near empty sensor 224 detects a small remaining amount.

<Determination of Sheet Feeding Control Mode Switching Threshold>

Determination of how many remaining recording sheets are needed to continue sheet feeding control in the sheet presence non-confirmation feeding mode can be made by performing calculation from a delay Tdly and a sheet leading end interval Tintvl. The delay Tdly is a duration of time from the sheet feeding permissibility determination to actual sheet feeding, and the sheet leading end interval Tintvl is an interval between leading ends of recording sheets at the time of continuous sheet passing.

Figure 8:
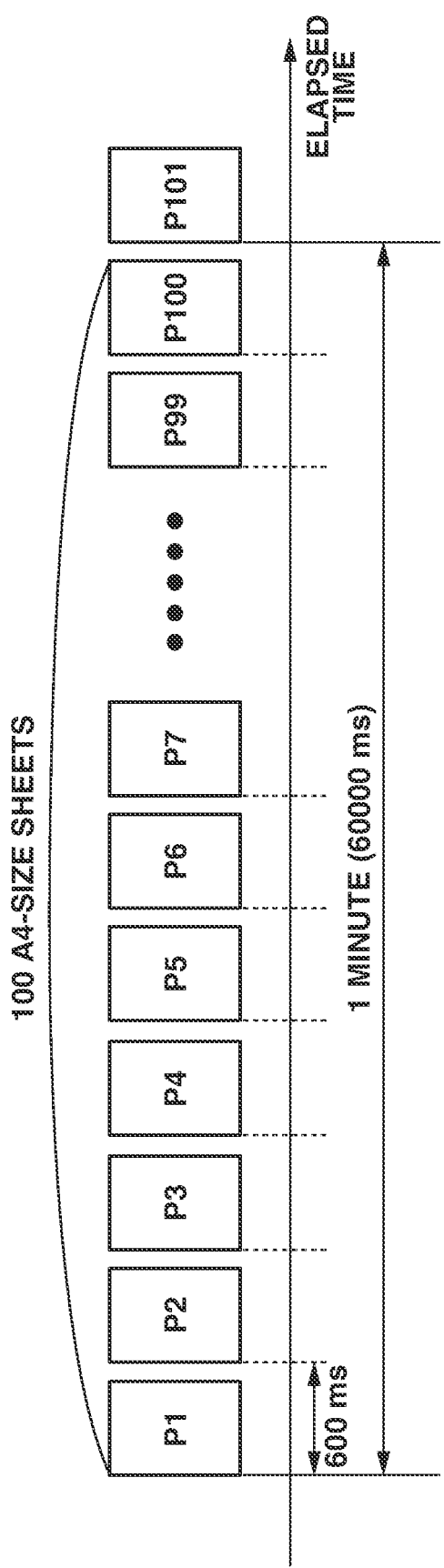
FIG. 8 is a diagram illustrating a method for calculating an interval between leading ends of recording sheets.

FIG. 8 illustrates a calculation method for an interval between leading ends of recording sheets. The sheet leading end interval between recording sheets at the time of continuous sheet passing can be calculated from a recording sheet productivity. For example, if printing can be performed on 100 A4-size recording sheets per one minute, time of one minute (ms) is divided by 100 sheets, that is, 60000/100=600. Thus, a sheet leading end interval is 600 ms.

FIG. 9 is a schematic diagram of a method for determining the number of remaining recording sheets with which a sheet presence non-confirmation feeding mode can be continued. FIG. 9 illustrates how many remaining recording sheets are needed to perform sheet feeding control of an interleaving sheet in a sheet presence non-confirmation feeding mode in a case where sheet feeding permissibility of an interleaving sheet I3 is determined. A remaining amount threshold for determining a small remaining amount of recording sheets is a quotient acquired by dividing Tdly by Tintvl, where Tdly is a delay that is a duration of time from sheet feeding permissibility determination to actual sheet feeding, and Tintvl is a sheet leading end interval between sheets. In a case where different sizes or surface properties of sheets are stacked in a mixed manner, productivity of each sheet may differ. In such a case, a sheet leading end interval is calculated from each productivity, and the smallest sheet-leading-end interval out of the calculated sheet-leading-end intervals is determined as Tintvl.

In FIG. 9, for example, if Tdly=3700 ms and Tintvl=600 ms, 3700/600≈6.167. In this case, the sheet feeding control in the sheet presence non-confirmation feeding mode can be performed until a recording sheet remaining amount reaches at least 6 sheets because recording sheets that precede interleaving sheets are not to be absent after confirmation of interleaving sheet feeding.

<Sheet Feeding Control Switching Flow Based on Sheet Feeding Control Mode Switching Threshold>

Figure 10A:
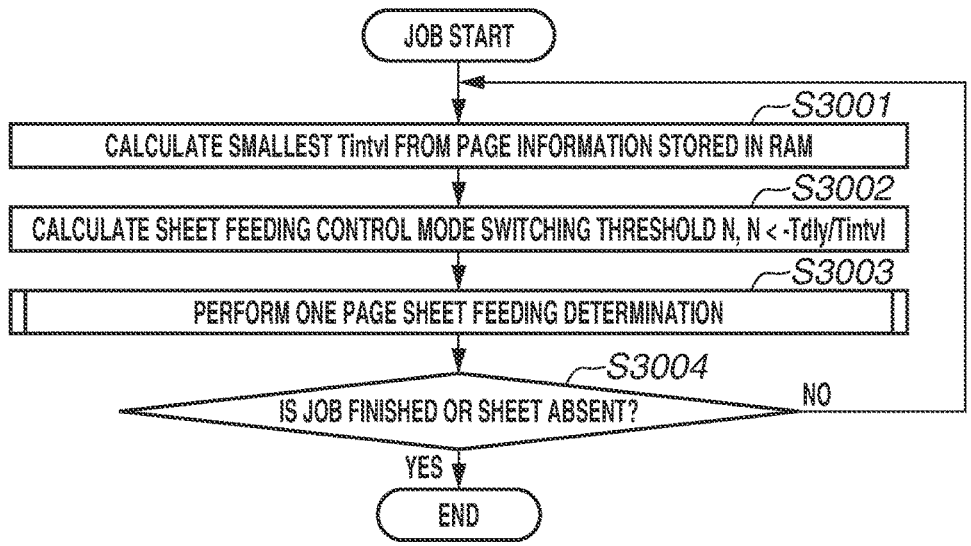
FIGS. 10A and 10B are flowcharts illustrating sheet feeding mode switching processing according to a second exemplary embodiment.
Figure 10B:
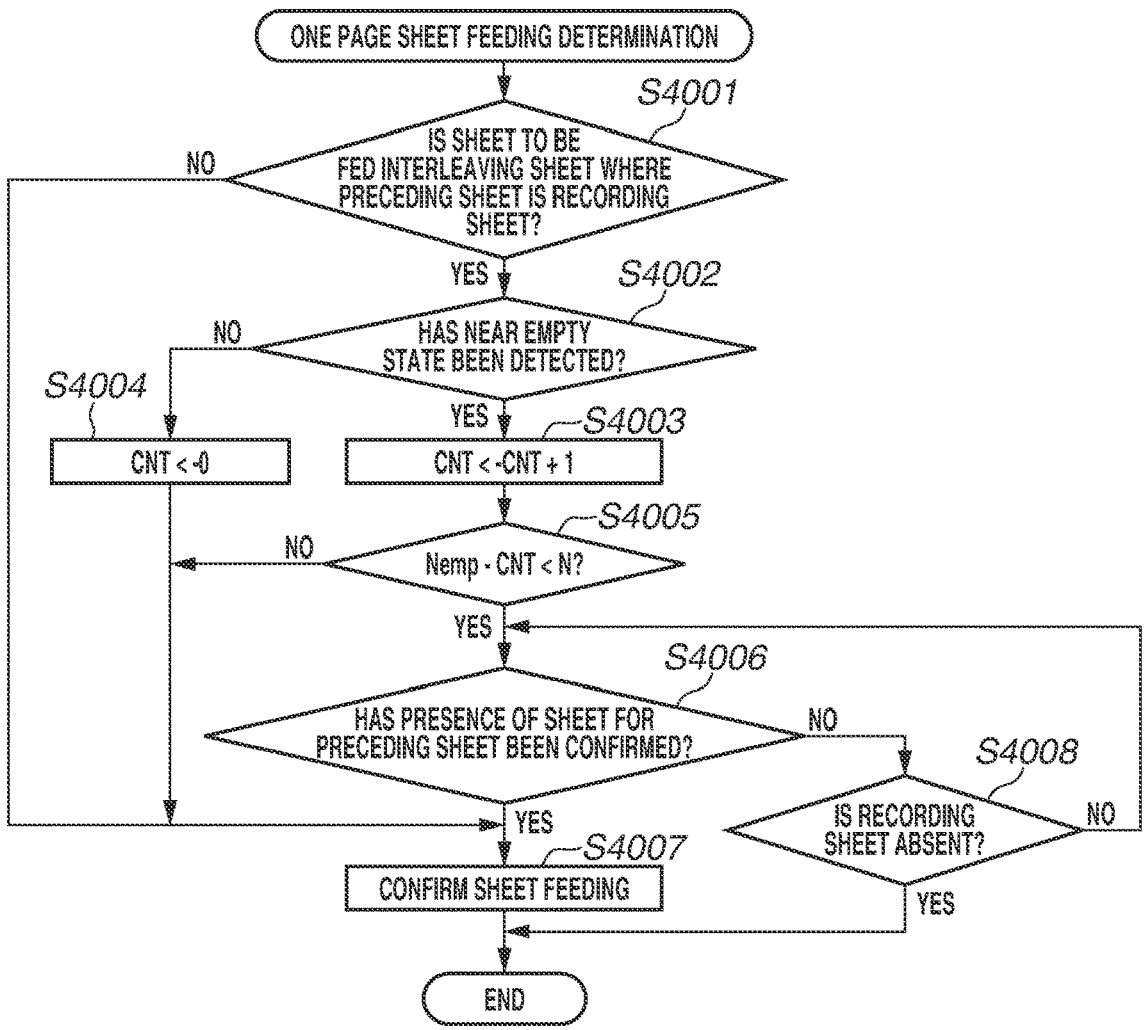

FIGS. 10A and 10B are flowcharts illustrating processing performed in a case where a sheet feeding control mode switching threshold N is determined from an actual sheet feeding delay Tdly, and sheet feeding control is performed in a sheet presence non-confirmation feeding mode until a recording sheet remaining amount reaches less than the threshold N.

When a job is started, the processing proceeds to step S3001. In step S3001, a CPU 901 calculates the smallest sheet-leading-end interval Tintvl by using information of a page queued in a RAM 903.

Subsequently, in step S3002, the CPU 901 calculates a sheet feeding control mode switching threshold N that is a quotient acquired by dividing an actual sheet feeding delay Tdly by Tintvl. Then, the processing proceeds to step S3003.

In step S3003, the CPU 901 executes processing of a one page sheet feeding determination illustrated in FIG. 10B. In step S4001, the CPU 901 reads out information of a sheet to be fed from now from the RAM 903. If the CPU 901 determines that the sheet to be fed from now is an interleaving sheet to be fed from an interleaving sheet tray 320 of an inserter 3, and an immediately preceding sheet is a recording sheet from a feed unit 22 (YES in step S4001), the processing proceeds to step S4002. If the CPU 901 determines that the sheet to be fed from now is from a tray other than the interleaving sheet tray 320, or the immediately preceding sheet is not a recording sheet (NO in step S4001), the processing proceeds to step S4007. In step S4007, the CPU 901 confirms sheet feeding.

In step S4002, the CPU 901 determines whether a recording sheet remaining amount of the feed unit 22 is greater than the number of remaining sheets Nemp detected by a near empty sensor 224. If a near empty state has not been detected yet (NO in step S4002), the processing proceeds to step S4004. In step S4004, the CPU 901 clears a variable CNT that is a count of the number of sheets fed after the near empty state is detected in printing. Then, the processing proceeds to step S4007. In step S4007, the CPU 901 confirms sheet feeding.

If the near empty state has been detected (YES in step S4002), the processing proceeds to step S4003. In step S4003, the CPU 901 increments the variable CTN.

In step S4005, the CPU 901 calculates the current number of remaining sheets by subtracting the variable CNT from the number of sheets Nemp at the time of detection of the near empty state. If the CPU 901 determines that the calculated number is smaller than the sheet feeding control mode switching threshold N determined in step S3002 (YES in step S4005), the processing proceeds to step S4006. In step S4006, the CPU 901 determines whether the presence of a sheet of the immediately preceding sheet has been confirmed by using a sheet feeding sensor 223. If the CPU 901 determines that the presence of a sheet of the immediately preceding sheet has been confirmed (YES in step S4006), an interleaving sheet can be fed without a problem. Thus, the processing proceeds to step S4007 and the CPU 901 confirms sheet feeding. If the CPU 901 determines that the presence of a sheet of the immediately preceding sheet has not yet been confirmed (NO in step S4006), the processing proceeds to step S4008. In step S4008, the CPU 901 determines whether a recording sheet is absent. At that time, if the CPU 901 determines that a recording sheet is absent (YES in step S4008), the CPU 901 determines that the sheet cannot be fed, and the sheet feeding determination processing ends.

If the CPU 901 determines that a recording sheet is not absent (NO in step S4008), the processing returns to step S4006, so that the CPU 901 repeats the processing until the presence of a sheet for the immediately preceding sheet is confirmed, or the recording sheet becomes absent. If the CPU 901 confirms sheet feeding in step S4007, or determines that the recording sheet is absent (Yes in step S4008), the sheet feeding determination ends, and the processing proceeds to step S3004 of the flowchart illustrated in FIG. 10A.

In step S3004, if the CPU 901 determines that a further sheet to be fed for the page information queued in the RAM 903 is absent (YES in step S3004), the processing flow illustrated in FIG. 10A ends.

Further, if the CPU 901 determines that a recording sheet to precede an interleaving sheet is absent in the feed unit 22 as a result of the processing in step S3003 (YES in step S3004), the processing flow ends, and the CPU 901 displays a message indicating that the recording sheet has become absent on a user interface 11.

In the present exemplary embodiment, the sheet feeding control is performed in a sheet presence non-confirmation feeding mode until a recording sheet remaining amount becomes smaller than the calculated number of sheets. The calculated number of sheets is acquired by calculating the number of recording sheets to be fed during time between sheet feeding determination of an interleaving sheet and actual sheet feeding. This can prevent a jam at the time of conveyance of the interleaving sheet and enhance productivity.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-108243, filed May 31, 2017, which is hereby incorporated by reference herein in its entirety.

What is claimed is:

1. An image forming apparatus comprising:
a storage unit configured to store recording sheets;
an image forming unit configured to form an image on a recording sheet fed from the storage unit;
an insertion unit, including an interleaving sheet tray on which an interleaving sheet is to be stacked, and configured to insert the interleaving sheet fed from the interleaving sheet tray between recording sheets conveyed from the image forming unit;
a first detection unit configured to detect presence of the recording sheet in the storage unit;
a second detection unit configured to detect a remaining amount of recording sheets in the storage unit; and
a control unit configured to execute a mode selected from among a plurality of modes including a first mode and a second mode, based on the remaining amount detected by the second detection unit,
wherein the first mode is a feeding mode for feeding the interleaving sheet, which is to be inserted by the insertion unit, from the interleaving sheet tray regardless of whether or not the first detection unit detects presence of the recording sheet in the storage unit, and
wherein the second mode is a detection mode for feeding the interleaving sheet, which is to be inserted by the insertion unit, from the interleaving sheet tray based on that the first detection unit detects presence of the recording sheet in the storage unit.

2. The image forming apparatus according to claim 1, wherein the insertion unit is arranged on a downstream side of the image forming unit in a recording sheet conveyance direction.

3. The image forming apparatus according to claim 1, wherein, if the second detection unit detects that the remaining amount of recording sheets in the storage unit is smaller than a threshold, the control unit controls the insertion unit to start feeding the interleaving sheet after a lapse of a sheet feeding preparation time after the second detection unit detects that a recording sheet, that precedes the interleaving sheet to be inserted, is present in the storage unit.

4. The image forming apparatus according to claim 1, wherein the control unit determines whether or not presence of a recording sheet is detected by the first detection unit after an immediately preceding recording sheet that precedes the recording sheet is fed from the storage unit.

5. An image forming apparatus comprising:
a storage unit configured to store recording sheets;
an image forming unit configured to form an image on a recording sheet fed from the storage unit;
an insertion unit, including an interleaving sheet tray on which an interleaving sheet is to be stacked, and configured to insert the interleaving sheet fed from the interleaving sheet tray between recording sheets conveyed from the image forming unit;
a remaining amount detection unit configured to detect a remaining amount of recording sheets in the storage unit,
wherein the image forming apparatus includes:
(1) a first mode in which, if the interleaving sheet stacked on the interleaving sheet tray is to be fed, a recording sheet that precedes the interleaving sheet to be inserted is confirmed to be present in the storage unit, and then the interleaving sheet is fed by the insertion unit; and
(2) a second mode in which, if the interleaving sheet stacked on the interleaving sheet tray is to be fed, the interleaving sheet is fed by the insertion unit without confirming that a recording sheet that precedes the interleaving sheet to be inserted is present in the storage unit; and
a setting unit configured to set a mode of the image forming apparatus to either the first mode or the second mode based on a detection result detected by the remaining amount detection unit.

6. The image forming apparatus according to claim 5, wherein the insertion unit is arranged on a downstream side of the image forming unit in a recording sheet conveyance direction.

7. The image forming apparatus according to claim 5, further comprising:
a detection unit; and
a control unit,
wherein, if the detection unit detects that the remaining amount of recording sheets in the storage unit is smaller than a threshold, the control unit controls the insertion unit to start feeding the interleaving sheet after a lapse of a sheet feeding preparation time after the detection unit detects that a recording sheet, that precedes the interleaving sheet to be inserted, is present in the storage unit.

8. The image forming apparatus according to claim 5, further comprising:
a detection unit; and
a control unit,
wherein the control unit determines whether or not presence of a recording sheet is detected by the detection unit after an immediately preceding recording sheet that precedes the recording sheet is fed from the storage unit.

* * * * *